(12) United States Patent
So et al.

(10) Patent No.: US 8,761,968 B2
(45) Date of Patent: Jun. 24, 2014

(54) SYSTEM AND METHOD FOR MULTIPLE AIRCRAFT LIFTING A COMMON PAYLOAD

(71) Applicants: Wilfred So, Mississauga (CA); Justin Eichel, Waterloo (CA); Linda Vu, Toronto (CA); Peter Szabo, Cambridge (CA)

(72) Inventors: Wilfred So, Mississauga (CA); Justin Eichel, Waterloo (CA); Linda Vu, Toronto (CA); Peter Szabo, Cambridge (CA)

( * ) Notice: Subject to any disclaimer, the term of this patent is extended or adjusted under 35 U.S.C. 154(b) by 0 days.

(21) Appl. No.: 13/750,384

(22) Filed: Jan. 25, 2013

(65) Prior Publication Data
US 2014/0025238 A1    Jan. 23, 2014

Related U.S. Application Data

(63) Continuation of application No. 12/472,982, filed on May 27, 2009, now Pat. No. 8,370,003.

(60) Provisional application No. 61/056,329, filed on May 27, 2008.

(51) Int. Cl.
*G01C 23/00* (2006.01)

(52) U.S. Cl.
USPC .................................................. 701/3

(58) Field of Classification Search
None
See application file for complete search history.

(56) References Cited

U.S. PATENT DOCUMENTS

| | | | |
|---|---|---|---|
| 3,656,723 A | 4/1972 | Piasecki et al. | |
| 3,746,279 A | 7/1973 | Maciolek et al. | |
| 4,121,246 A * | 10/1978 | Fadden et al. | 348/117 |
| 4,601,444 A | 7/1986 | Lindenbaum | |
| 5,521,817 A | 5/1996 | Burdoin et al. | |
| 5,593,113 A | 1/1997 | Cox | |
| 5,906,336 A | 5/1999 | Eckstein | |
| 6,133,867 A | 10/2000 | Eberwine et al. | |
| 6,252,525 B1 | 6/2001 | Philiben | |
| 6,480,789 B2 | 11/2002 | Lin | |
| 7,006,032 B2 | 2/2006 | King et al. | |
| 7,137,598 B2 | 11/2006 | Von Thai | |
| 7,840,317 B2 | 11/2010 | Matos et al. | |
| 7,889,328 B2 | 2/2011 | Tilloston | |
| 7,954,766 B2 | 6/2011 | Brainard et al. | |
| 8,276,535 B1 * | 10/2012 | Karem | 114/261 |
| 2003/0089821 A1 * | 5/2003 | Miralles et al. | 244/49 |
| 2006/0184292 A1 | 8/2006 | Appleby et al. | |
| 2007/0168117 A1 | 7/2007 | Howard et al. | |
| 2007/0288132 A1 | 12/2007 | Lam | |
| 2008/0240062 A1 | 10/2008 | Lynch et al. | |

* cited by examiner

*Primary Examiner* — Thomas Tarcza
*Assistant Examiner* — Adam Alharbi
(74) *Attorney, Agent, or Firm* — Wilfred P. So; Blake, Cassels & Graydon LLP

(57) ABSTRACT

A system and method are provided for controlling a plurality of aircraft to lift a common payload. The system comprises of multiple aircraft tethered to a common payload, where the group of aircraft form a swarm that is controlled by a pilot station. Each aircraft is autonomously stabilized and guided through a swarm avionics unit, which further includes sensor, communication, and processing hardware. At the pilot station, a pilot remotely enters payload destinations, which is processed and communicated to each aircraft. The method for controlling a multi-aircraft lifting system includes of inputting the desired location of the payload, and determining a series of intermediary payload waypoints. Next, these payload waypoints are used by the swarm waypoint controller to generate individual waypoints for each aircraft. A flight controller for each aircraft moves the aircraft to these individual waypoints.

21 Claims, 12 Drawing Sheets

SYSTEM AND METHOD FOR MULTIPLE AIRCRAFT LIFTING A COMMON PAYLOAD

This application is a continuation of U.S. patent application Ser. No. 12/472,982, filed on May 27, 2009, which claims priority from U.S. Application No. 61/056,329, filed on May 27, 2008, the entire contents of which are incorporated herein by reference.

FIELD OF TECHNOLOGY

The invention relates in general to autonomous control systems of aircraft, and, more particularly, to multi-aircraft lifting control systems.

DESCRIPTION OF THE RELATED ART

Aircraft, for example helicopters and airships, that are able to perform unique maneuvers, such as taking off and landing vertically or hovering in one area, have many industrial and commercial applications; they are used as air ambulances, aerial cranes, and military vehicles. These aircraft are also used to transport heavy payloads to locations that are difficult or impossible to reach by ground transportation and other aircraft. The lifting capacity of an individual aircraft approaches limitations asymptotically because lifting a heavier payload requires stronger support mechanisms, larger engines, more fuel, and a larger aircraft overall. The aircraft's weight therefore increases in proportion to the weight that it is to lift. Further, constructing, maintaining and storing large aircraft becomes difficult because of size, for example in extremely large airships. Despite improving load capacities, there is still an ongoing demand to transport much greater loads in both the commercial and military sectors.

One way to transport greater loads is through the coordinated flight of multiple aircraft. In other words, multiple pilots can fly in formation to carry a common payload. This is done by tethering the payload to multiple helicopters using cables. By way of background, helicopters, for example, have rotating blades that provide lift and allow them to hover in a stationary position. However, to maintain stability in a helicopter, a pilot must constantly adjust the primary controls such as the cyclic stick, collective stick and rudder pedals. In order for the helicopters to lift the load together, they must redirect some of their thrust from lift to counter the horizontal forces pulling the helicopters together. These complex maneuvers further require a pilot to communicate his own efforts with other pilots, thereby increasing cognitive loading on the pilots. It is therefore very difficult and dangerous for multiple helicopters to fly in formation or in close proximity to one another.

Alternative methods for improving the safety and reliability of two or more helicopters operating in close proximity have been developed. For example, U.S. Pat. No. 3,746,279 describes a "spreader bar" connected to a mass and tethered to each participating helicopter. The purpose of this bar is to reduce the need of the helicopters to lean away from one another while in hover. However, the spreader bar incurs the disadvantage of set-up time and effort to attach the spreader bar, while incurring a weight penalty on the payload capacity. The patent also describes a leader aircraft that is coupled to the controls of the other aircraft. The close coupling between the leader and slave aircraft creates a dependency, such that a failure in the leader aircraft may result in the overall failure of the flight system.

Further, U.S. Pat. No. 3,656,723 describes a single truss network to fix all helicopters into a rigid formation. In this system, a single pilot can simultaneously direct the system using the same control signal that is relayed to the network of helicopters. This has the advantages of eliminating pilot to pilot communication error as well as preventing any mid air collisions by failed coordination. However, a truss network for helicopters does not easily accommodate variances to the type or quantity of employed helicopters in the formation. Also, if a single helicopter has a mechanical failure it not only ceases to provide lift, but becomes a liability to the rest of the system. An inoperable helicopter becomes a parasitic load because it is permanently fixed to the truss.

Other prior art include U.S. Pat. No. 5,521,817, which describes a method for semi-autonomous control of multiple aircraft. This control system demonstrates how a single unmanned drone can lead a group of followers. This lead drone, which is remotely controlled from the ground, relays flight information to the followers. As the group moves, the followers react to the relative movement of surrounding drones to prevent mid air collisions. However, the drones of this system cannot function as a group to accomplish a task beyond relocation. As discussed earlier, the coordination of multiple aircraft to lift a common payload requires a more robust and precise control system that considers the dynamic and kinematic effects of a swinging payload.

Therefore, it is an object of the invention to obviate or mitigate at least one of the above-mentioned problems.

SUMMARY

The semi-autonomous system for multiple aircraft lifting a common load comprises of at least two aircraft, a single payload, and a pilot station, which allows a single pilot to control the swarm in a remote and safe environment.

The payload is connected to each aircraft through tethers and anchors. A tether extends from each aircraft's tethering anchor to the payload's tethering anchor. The anchors allow the tethers to be easily attached or released, and also prevent tangling. The location and orientation of the payload is determined through sensors, for example a Global Positioning System.

Each aircraft has autonomous flight capabilities and, therefore, can stabilize and move to different locations without a pilot. The autonomous flight functionality is implemented through a swarm avionics unit, which interacts with the aircraft's flight controller. The swarm avionics unit receives control signals from the pilot station and transmits aircraft sensory data to the pilot station. Sensory data about the aircraft and payload are used to stabilize and guide the aircraft through a flight controller algorithm.

Command of the entire multi-aircraft lifting system takes place at a remotely located pilot station. The pilot does not control the aircraft movement directly but, instead, inputs commands regarding the desired location of the payload. A payload waypoint controller calculates intermediary waypoints between the current and desired positions. These payload waypoints are used by the swarm waypoint controller to generate individual waypoints for each aircraft. These aircraft waypoints are then transmitted wirelessly to the swarm avionics unit on each aircraft.

BRIEF DESCRIPTION OF THE DRAWINGS

The features of the invention will become more apparent in the following detailed description in which reference is made to the appended drawings wherein.

DESCRIPTION OF THE PREFERRED EMBODIMENTS

Figure 1:
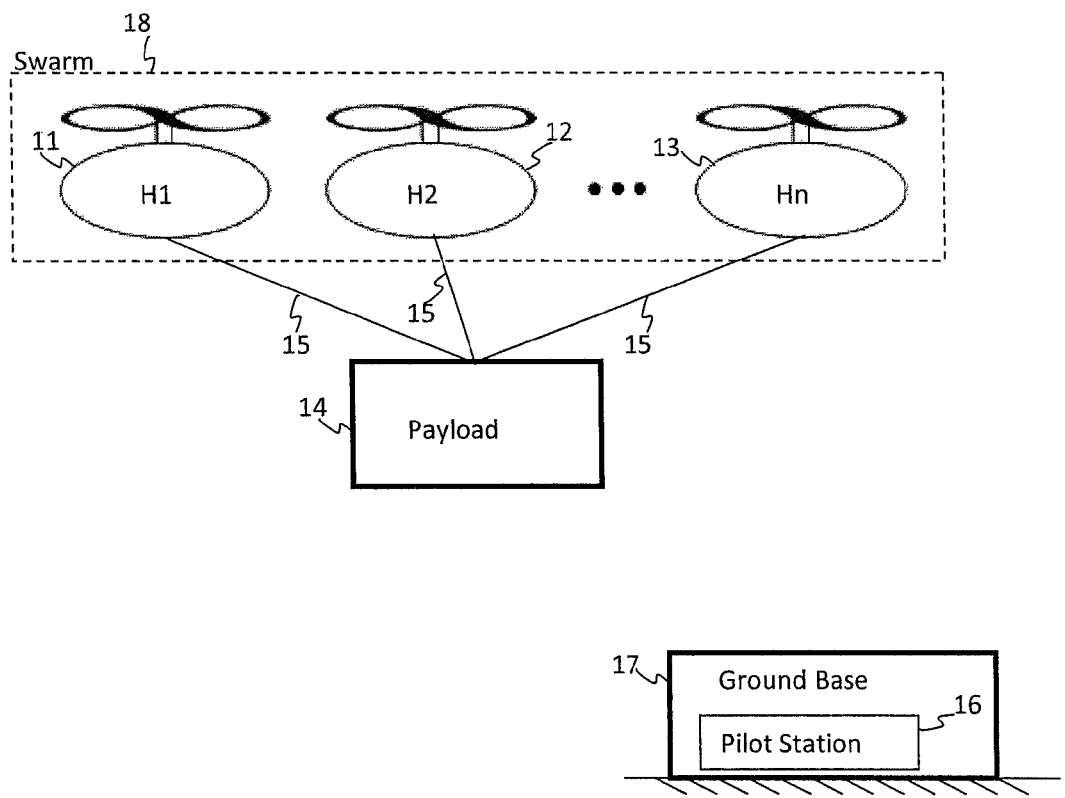
FIG. 1 is a schematic representation of a configuration for a multi-aircraft lifting system.

Referring to FIG. 1, a semi-autonomous multi-aircraft lifting system comprises of several aircraft 11,12,13, operating in formation attached to a single payload 14 by means of tethers 15. Aircraft hereon refers to vehicles capable of hovering such as, by way of example, the UH-1 helicopter, V22 Osprey, F-35 Joint Strike Fighter, and a lighter-than-air airship or dirigible. Examples of heavy lifting airships include SkyHook International's JHL-40, CargoLifter's CL160 Super Heavy-Lift Cargo Airship and DARPA's Walrus heavy transport blimp. The number of aircraft in the multi-aircraft system may range from two to n units, and are labeled $H_1$ 11, $H_2$ 12, and $H_n$ 13. A multi-aircraft lifting system has the advantage over a single aircraft in being capable of lifting a payload weight that is greater than a single aircraft's lift capacity. In other words, if a single aircraft carries x kg, then n aircraft can carry a payload of up to nx kg. A group of aircraft flying together will hereon be referred to as a swarm 18. Note that the aircraft within the swarm 18 are not required to be of the same type as to allow different aircraft to operate within the multi-aircraft lifting system.

Figure 2:
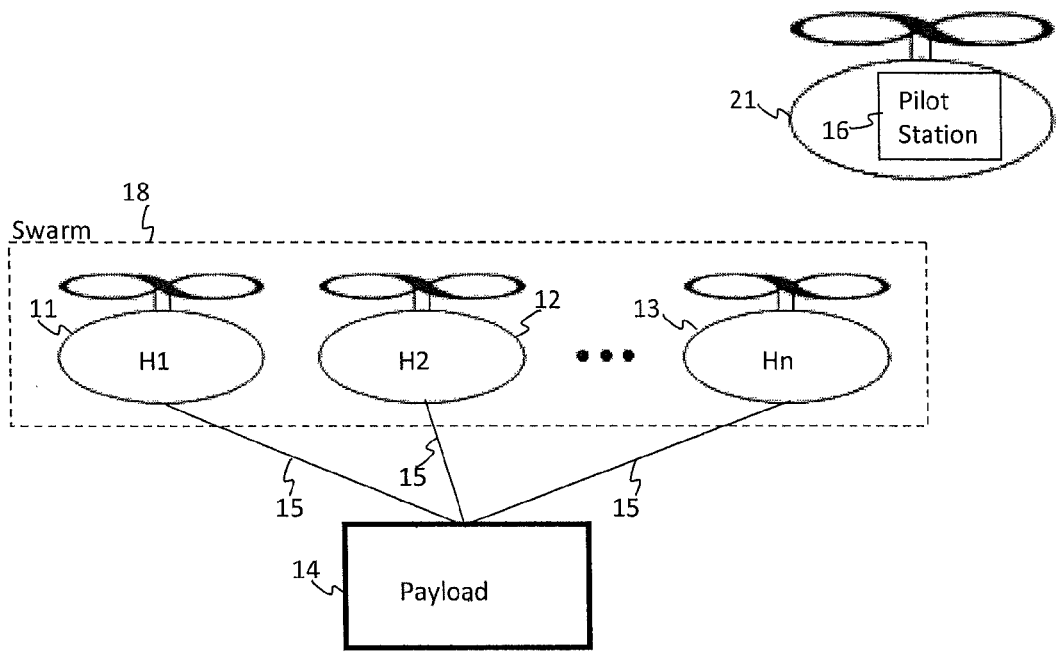
FIG. 2 is a schematic of an alternate configuration to FIG. 1.
Figure 3:
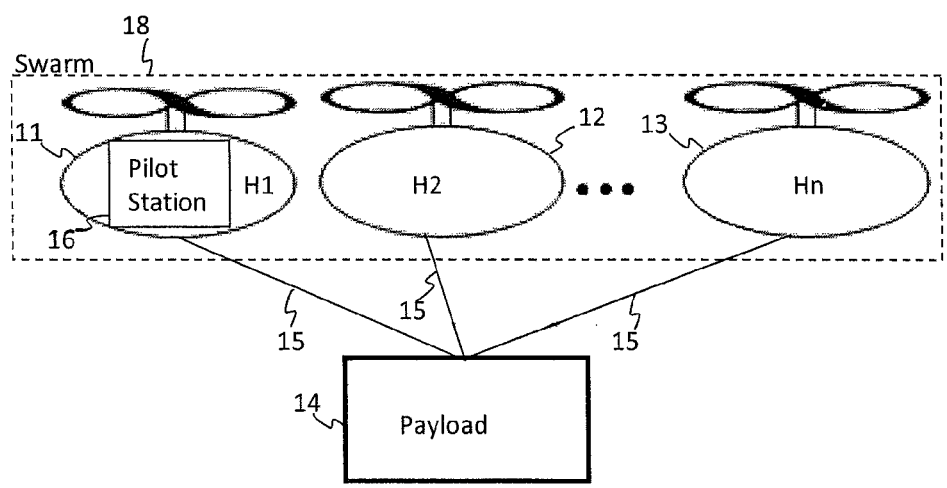
FIG. 3 is a schematic of yet another configuration to FIG. 1.

Continuing with FIG. 1, it should be appreciated that a pilot is not required to operate each of the aircraft 11, 12, 13. Instead, a pilot station 16, requiring a minimum of one operator or pilot, operates the multi-aircraft lifting system. The pilot station 16 may be located in a ground base 17 for remote operation. Alternatively, as shown in FIG. 2, the pilot station 16 may be located in a vehicle, for example, an aircraft 21, that is ancillary to the swarm 18. In yet another embodiment, referring to FIG. 3, the pilot station 16 may be located within one of the swarm's aircraft. These pilot configurations advantageously allow for a reduced number of human operators and can allow a human operator to remain at a safe distance from the lifting procedure. It is also appreciated that the piloting operations may not require a human operator as many control systems are well known to automatically pilot aircraft.

Figure 4:
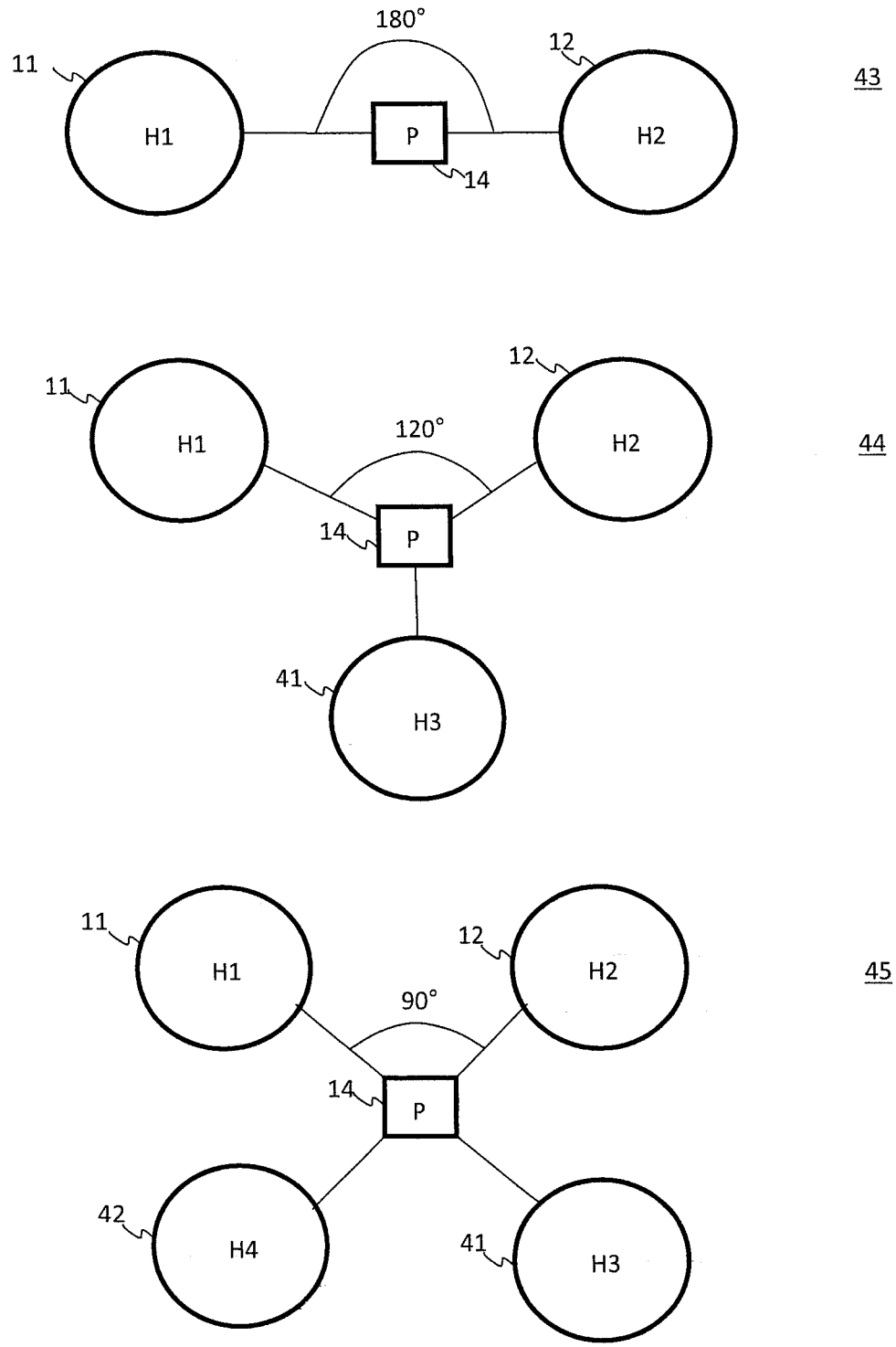
FIG. 4 is a diagram of several swarm patterns for a multi-aircraft lifting system.

It should also be appreciated that the number of aircraft that compose the swarm 18 affects the flight formation pattern as shown from a top-down perspective in FIG. 4. In a two-aircraft swarm formation 43, comprising aircraft 11,12, the aircraft are positioned 180° from each other to facilitate equal tension in the tethers and, thereby facilitating the stability in transport of the payload. Similarly, for a three-aircraft swarm formation 44 (comprising 11,12,41), the aircraft are positioned 120° apart, while for a four-aircraft swarm formation 45 (comprising 11,12,41,42), the aircraft are positioned 90° apart. Note that the number of aircraft in the swarm is not limited to four.

Moreover, any swarm formation that allows multiple aircraft to lift a common payload is applicable to the principles herein. In some situations, it may be preferable that the aircraft are configured in an irregular formation, for example, to accommodate different payload sizes and uneven weight distribution. Aircraft in a swarm may be of a different type, each with different lifting and flight performance capabilities. Thus, it may also be preferable to configure swarm lifting formations based on aircraft type.

Figure 5:
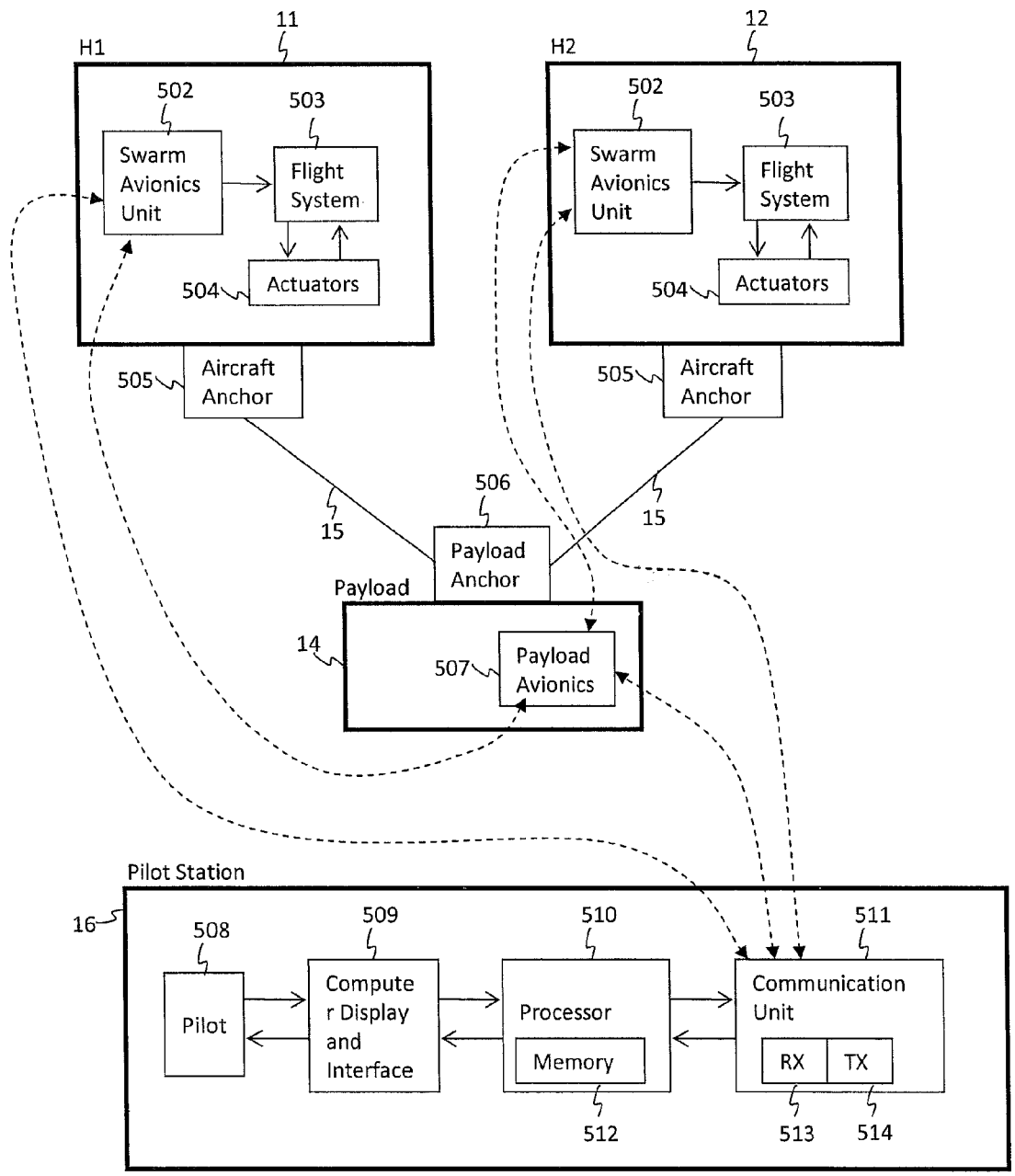
FIG. 5 is a schematic representation of the functionalities and hardware for a multi-aircraft lifting system.

Referring to FIG. 5, the components of the multi-aircraft lifting system is shown in further detail. A representation of a two-aircraft swarm consisting of aircraft $H_1$ 11 and $H_2$ 12 are carrying a payload 14. Within each aircraft 11, 12 there is a swarm avionics unit 502 that gathers sensory and flight data to determine flight control commands. The computed flight control commands are sent to the aircraft's flight system 503, which is an electrical interface to the aircraft's actuators 504. By way of background, a highly complex flight system may have autopilot functionality to control the aircraft's actuators 504. Common helicopter actuators include, but are not limited to, tail rotor motors, main rotor motors, flapping hinge actuators, and pitch control rod actuators. Common airship actuators include rotors, flaps, thrust vectoring devices, ballasts, ballonet valves, means for filling and emptying the airship with lifting gas, and devices for heating and cooling the lifting gas within the airship.

Figure 6:
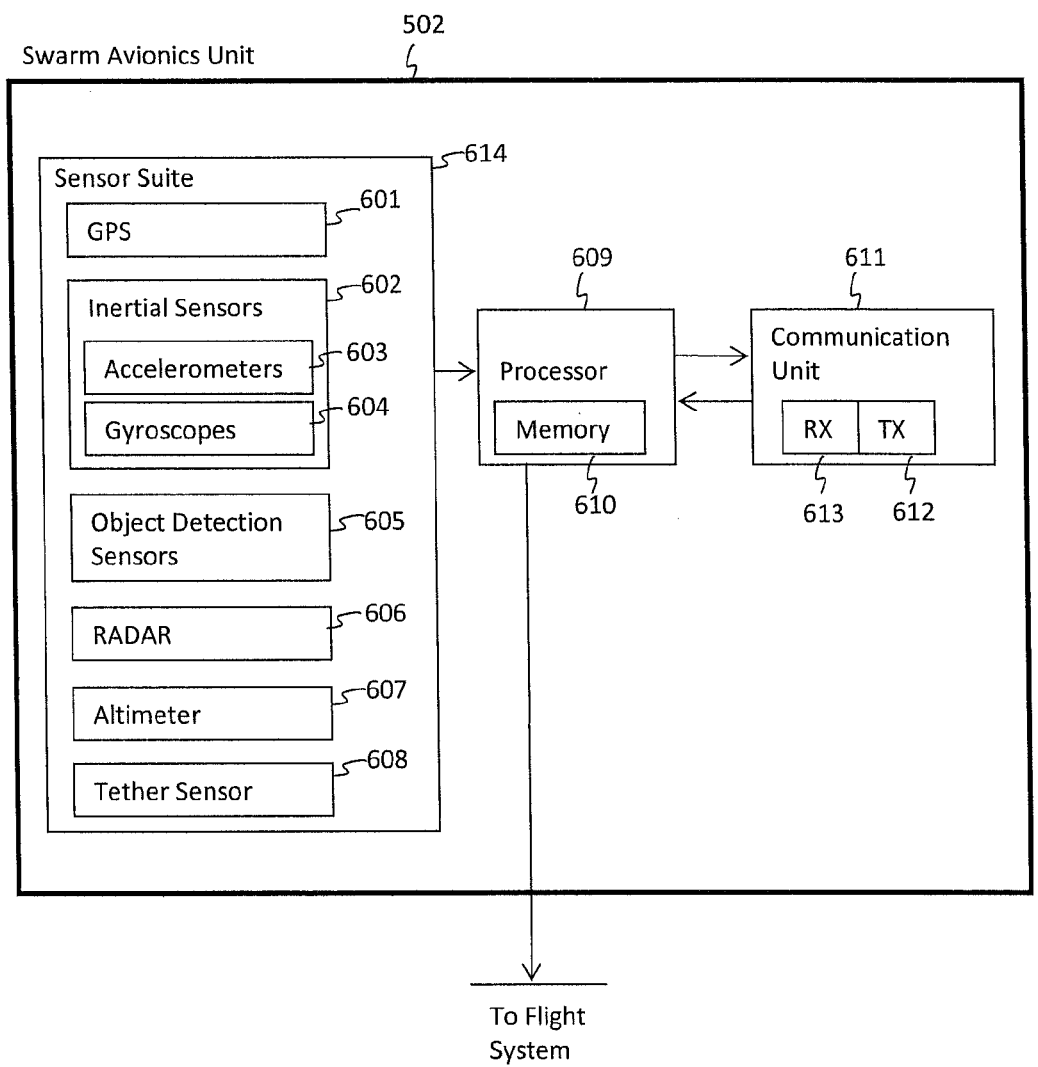
FIG. 6 is a schematic representation of the swarm avionics.

The swarm avionics unit 502 is a critical part of the swarm control system as shown in detail in FIG. 6. The swarm avionics unit 502 comprises a sensor suite 614 that collects data about the aircraft through a variety of sensors. Specifically, the sensor suite 614 should output data directly or indirectly pertaining to an aircraft's angular and translational position, velocity, and acceleration, and any sensors able to provide such data are applicable to the principles described herein. The sensor suite 614 may include a Global Positioning System (GPS) 601, which provides absolute position, absolute speed, and a reference of merit for the sensor suite's output data. Similarly inertial sensors 602, typically consisting of accelerometers and gyroscopes, provide absolute speed, attitude, heading, and a reference of merit for the sensor suite's output data. Object detection sensors 605, for example, ultrasound and infrared, provide distance measurements between the payload, aircraft, and other objects. Radar 606 provides relative distances to other aircraft. An altimeter 607 provides the altitude. A tether sensor 608 provides the magnitude and direction of force from the tether acting on the aircraft.

Data from the sensor suite 614 is sent to the swarm avionic unit's processor 609 for real-time data processing. Processed aircraft data is wirelessly transmitted to the pilot station 14 through the communication unit 611, which includes a transceiver 612 and receiver 613. The processor 609 also receives swarm waypoint control signals from the pilot station 16 through the receiver 613. The control signals and the sensor suite data are inputs to the flight control algorithms, which are stored in the memory 610. The flight control algorithms compute in real-time and output flight control commands. Details regarding the flight control algorithms are discussed further below. Flight control commands are sent from the processor 609 to the aircraft's flight system 503.

Referring back to FIG. 5, the payload 14 is connected to each aircraft 11, 12 using tethers 15. Each tether 15 is attached to the aircraft 11,12 through an aircraft tethering anchor 505 and similarly, is attached to the payload 14 through a payload tethering anchor 506. Both the aircraft and payload anchors 505,506 have a release mechanism that detaches the tether from the aircraft and payload respectively. The anchors 505, 506 are also used to reduce tangling during flight manoeuvres. It should be noted that the tethers 15 are not required to be at right angles to the payload tethering anchor 506 in order to maintain equal force distribution in each tether 15. The payload tethering anchor 506 is easily attachable to variety of surfaces to facilitate short cycle times for setting up a multi-aircraft lifting system.

It can be appreciated that the tethers 15 need not be flexible and may, instead be or include rigid materials. For example, the tethers 15 may be rigid bars. Any means for attaching the payload 14 to the aircraft 11, 12 are applicable to the principles herein.

Figure 7:
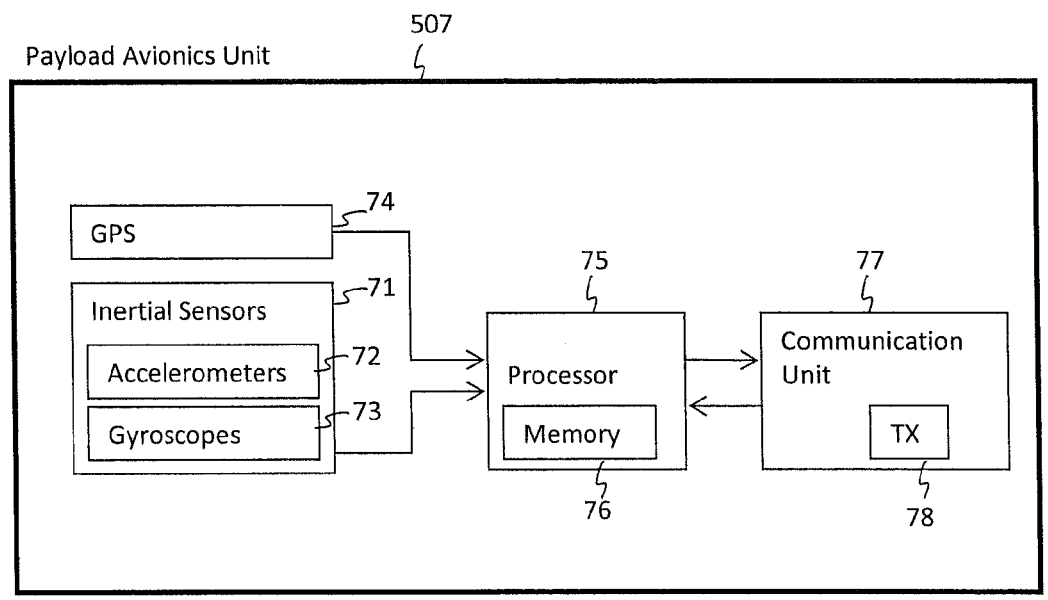
FIG. 7 is a schematic representation of the payload avionics.

Attached to the payload 14 is a payload avionics unit 507 that gathers sensory data about the location and orientation of the payload 14, and transmits the data to the pilot station 16 and the aircraft 11, 12. Turning to FIG. 7, a detailed schematic representation shows that the payload avionics unit 507 consists of inertial sensors 71 to provide absolute speed, attitude, and heading data about the payload 14. Examples of inertial sensors include, but are not limited to, accelerometers 72 and gyroscopes 73. Similarly, GPS 74 determines the absolute position and speed. Data from the inertial sensors 71 and GPS 74 are collected and computed by a real-time processor 75 having on-board memory 76. The processed data is then sent to a communication unit 77 with a transceiver 78 that is capable of transmitting the processed payload sensory data to the pilot station 16 and aircraft 11,12.

Returning again to FIG. 5, the pilot station 16 receives data about the payload 14 and individual aircraft 11, 12 within the swarm 18 through the pilot station's communication unit 511. Note that the communication unit 511 has a wireless receiver 515 and transceiver 514. Wireless communication media between the aircraft 11,12, payload 14 and pilot station 16 may include, for example, radio, satellite, Bluetooth, and laser. As shown in dotted lines, the communication unit 511 is in communication with the swarm avionics units 502 and the payload avionics 507. Similarly, the payload avionics unit 502 is in communication with the swarm avionics units 502. The received sensory data is processed in real-time by a processor 510, which then sends the situational data to a computer display and interface 509 for the pilot 508 to view. The pilot 508 uses the current position and velocity of the swarm 18 and payload 14 to determine the flight path of the payload. The pilot 508 then inputs desired positions for the payload, called waypoints, into the computer 509 through interface devices, such as a keyboard, mouse, control stick, or control pad. The pilot's commands are sent to the processor 510, which holds payload waypoint control algorithms and swarm waypoint control algorithms within the memory 512. The processor uses the control algorithms to compute swarm waypoint commands for each aircraft within the swarm in order to move the payload to the desired waypoint. Details regarding the payload waypoint and swarm waypoint control algorithms are discussed further below. These waypoint commands are transmitted through the pilot station's transceiver 514 and are received by each aircraft's receiver 613.

The above components are used to implement the multi-aircraft lifting system, which is dependent on the control system. The overall function of the multi-aircraft control system is to stabilize and guide each aircraft, while determining the flight path for each aircraft such that the payload 14 moves from its initial position to a final position as commanded by the pilot 508. Subsidiary functions of the multi-aircraft control system include maintaining a safe distance between aircraft and proper positioning to support the payload 14.

Figure 8:
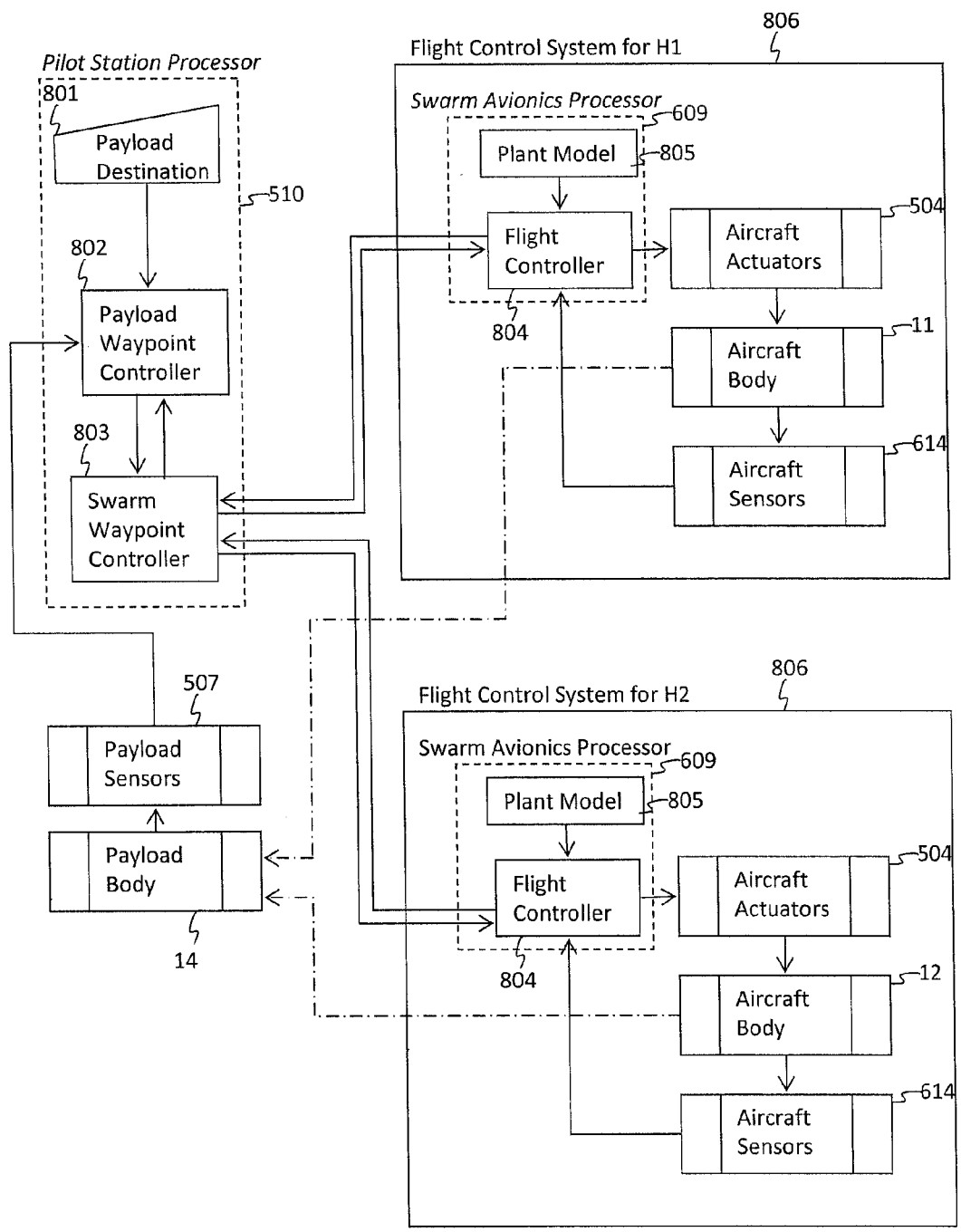
FIG. 8 is a flowchart of the control system for a multi-aircraft lifting system.

Referring to FIG. 8, an overview of the multi-aircraft lifting control system is shown with respect to the pilot station processor 510 and swarm avionic processors 609. The main components of the multi-aircraft lifting control system include the payload waypoint controller 802, the swarm waypoint controller 803, and the flight control system 806. The flight control system 806 is implemented for each aircraft 11, 12, 13. The payload waypoint controller 802 and the swarm waypoint controller 803 are run on the pilot station's processor 510. Similarly, the flight controller 804 and aircraft plant model 805, within the flight control system 806, are run on the swarm avionics processor 609.

A benefit of the preferred embodiment is shown more clearly in FIG. 8. The control of the swarm is not localized to an aircraft and, instead, is ancillary to the aircraft. This mitigates or obviates the need for an aircraft leader for the swarm 18. Therefore, in the event an aircraft fails, the multi-aircraft lifting system has the robustness to continue supporting the payload 14. For example, four aircraft, each capable of lifting 500 kg, are transporting a 1200 kg payload in a swarm pattern 45 spaced 90° apart. If a flight control system 806 on one of the aircraft fails, the anchors 505, 506 will allow the failed aircraft to leave the swarm 18. The three remaining aircraft then adapt by forming a different swarm pattern 44 spaced 120° apart, while the payload waypoint controller 802 and swarm waypoint controller 803 continue to navigate the swarm 18.

Continuing with the control system in FIG. 8, the payload waypoint controller 802 monitors and controls the payload state variables, such as payload acceleration, velocity, position, and orientation. The payload waypoint controller 802 also generates a path along which the payload 14 will travel from its current state to the desired payload state as determined by the pilot 508. The payload's path is formed by generating appropriate waypoints between the initial and final states, and calculates a path from the payload's initial state to the first waypoint. The path is mathematically interpolated, by way of example, through multiple splines that are used to determine the value of each state at a certain time t. This path is sent to the swarm waypoint controller 803, which coordinates the individual aircraft within the swarm 18 to obtain the desired payload state at time t. It should be appreciated that other interpolation methods, such as Bezier curves, discrete steps, and linear interpolation may be used in place of splines. Other path planning controllers that may be used include fuzzy-logic and Bang-bang controllers.

Figure 10:
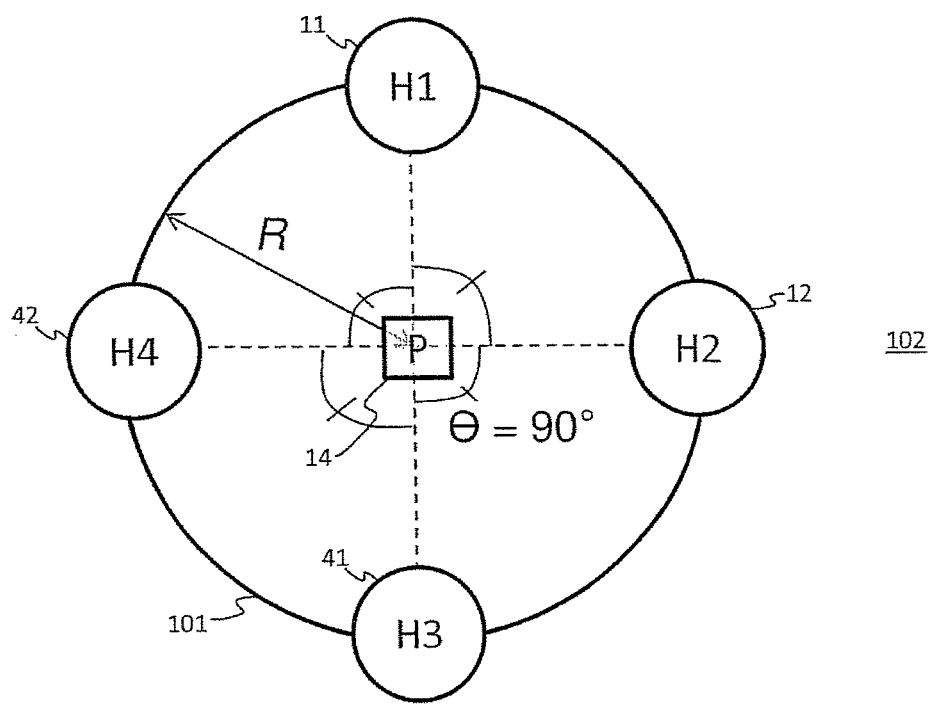
FIG. 10 is a schematic of relative positioning between a swarm and a payload.
Figure 10:
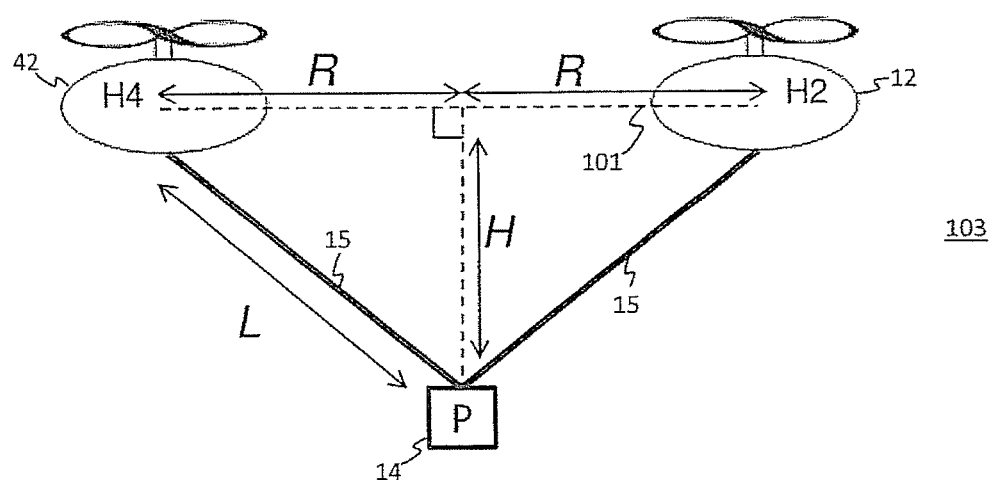

The swarm waypoint controller 803 uses the previously generated payload path to determine the relative orientations and positions for all of the individual aircraft. Turning to FIG. 10, a positioning configuration for four aircraft, by way of example, is shown. The positions on each aircraft 11, 12, 41, 42, relative to the payload 14, is determined by two constants. The first constant is the height difference H between the payload 14 and the swarm plane 101, and second constant is the radius R between each aircraft 11, 12, 41, 42 to the center of the swarm plane 101. It should be noted that the swarm plane 101, as shown by the overhead view 102, is described by a circle of radius R, in which each aircraft 11, 12, 41, 42 is positioned at the circumference of the circle and separated by a constant angle θ, where θ=360°/(number of aircraft). In the example of a four aircraft swarm, the angular separation θ is 90°. Furthermore, if the length L of the tethers 15 are of the same length, then all points within the swarm plane 101, including each aircraft, should have the same altitude. As seen by the front profile 103, the payload 14 is located directly below the center of the swarm plane 101 by a height difference H. It should be appreciated that the R and H constants are determined by considering many factors, including, for example, the size of the aircraft, the number of aircraft, the desired horizontal to vertical force ratios, and the size of the payload. The tethers 15 between the payload 14 and aircraft 11, 12, 41, 42 all have the same length, L, which is approximated by the Pythagorean relationship $L=(R^2+H^2)^{1/2}$. Thus, the swarm waypoint controller 803 maintains the relative positioning based on the constant radius R of the aircraft and the payload's height H below the swarm plane 101.

Figure 11:
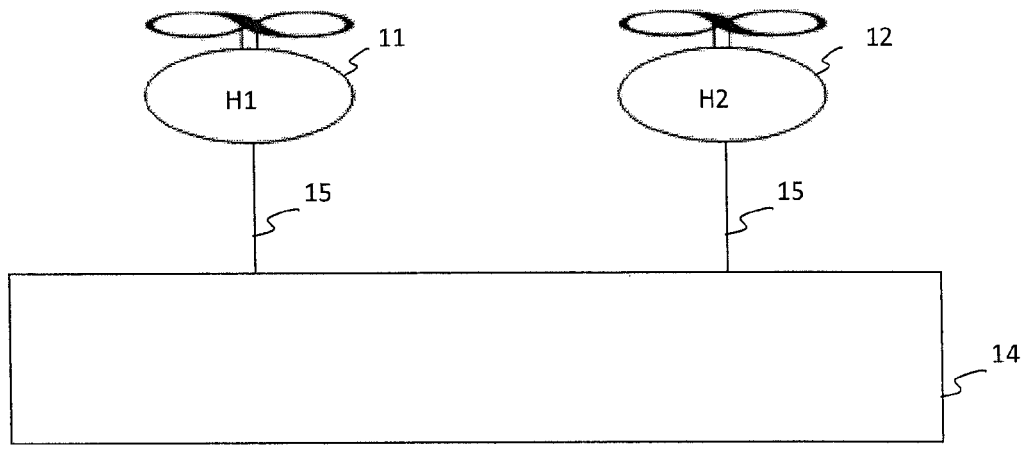
FIG. 11 is another schematic of relative positioning between a swarm and a payload.

Turning to FIG. 11, the payload 14 may be very large where it is advantageous for each aircraft 11, 12 to support different portions of the payload 14. During a straight-path transport, the swarm waypoint controller 803 ensures that each aircraft 11, 12 maintains a relative position to each other and the payload 14, whereby the tethers 15 remain approximately vertical.

Figure 12:
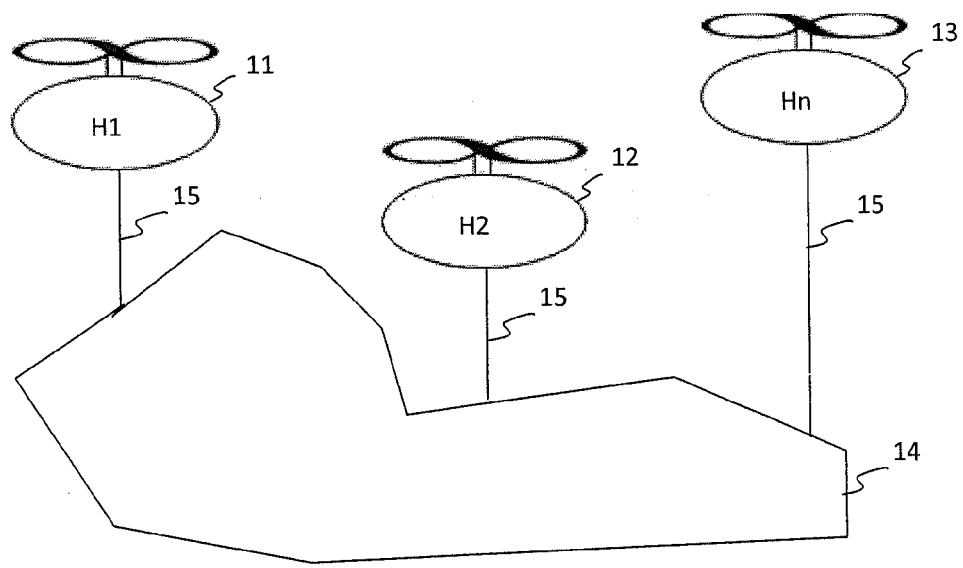
FIG. 12 is another schematic of relative positioning between a swarm and a payload with tethers of different lengths.

In FIG. 12, the payload 14 is very large and has an irregular shape. Three aircraft 11, 12, 13 are attached to the payload 14 using various lengths of tethers, such that each aircraft has different elevation relative to each other. The swarm waypoint controller 803 ensures that each aircraft 11, 12, 13 maintains their relative elevations to ensure that equal tension. It can further be appreciated that the H1 (11) may be a helicopter, while H2 (12) and Hn (13) may be airships. In such a case, the swarm waypoint controller 803 would also need to take into account various flight performance specifications, such as lifting power, to maintain the relative orientations of the aircraft and payload 14. It can thus be seen that the swarm waypoint controller 803 can be configured to maintain various relative positioning formations between the aircraft in the swarm 18 and the payload 14.

Returning to FIG. 8, this swarm waypoint controller 803 calculates the payload states based on the states of each aircraft; the payload position may be determined from the position of all aircraft relative to ground and the Euclidian distance from each aircraft to the payload. Alternatively, the payload position may be determined by the payload avionics unit 507. Each aircraft body 11,12 in the swarm 18 affects the position of the payload body 807 and consequently, the payload sensors' 507 readout. The computed payload state information is sent to the payload waypoint controller 82.

This swarm waypoint controller 803 generates waypoints to guide each aircraft while the payload 14 moves along the desired path. These intermediate waypoints ensure that each aircraft is properly positioned relative to each other such that the payload force is equally distributed to each aircraft. In other words, where the lifting power of each aircraft is similar, the tension force in the tethers 15 should be approximately equal. Multiple spline paths are calculated to provide a means to determine each state for each aircraft at a certain time t. The swarm waypoint controller 803 provides the reference signal to each individual flight control system 806 within the swarm 18 using the spline paths that were previously generated.

The flight control system 806 is responsible for the flight and stability of an individual aircraft. The flight control system 806 calculates the required actuation signals necessary for the plant model 805 to track the reference control signal provided by the swarm control system 803. The flight control system 806 is also responsible for tracking the reference signal within a specified tracking error and overshoot, as specified later in more detail. Achieving these flight control system specifications allows the aircraft actuators 504 to position the aircraft body 11, 12 at a safe distance from each other and at the proper locations to support the payload 14, as was determined by the swarm waypoint controller 803. This flight control system 806 then returns the observed state of the aircraft to the swarm waypoint control system 803.

Figure 9:
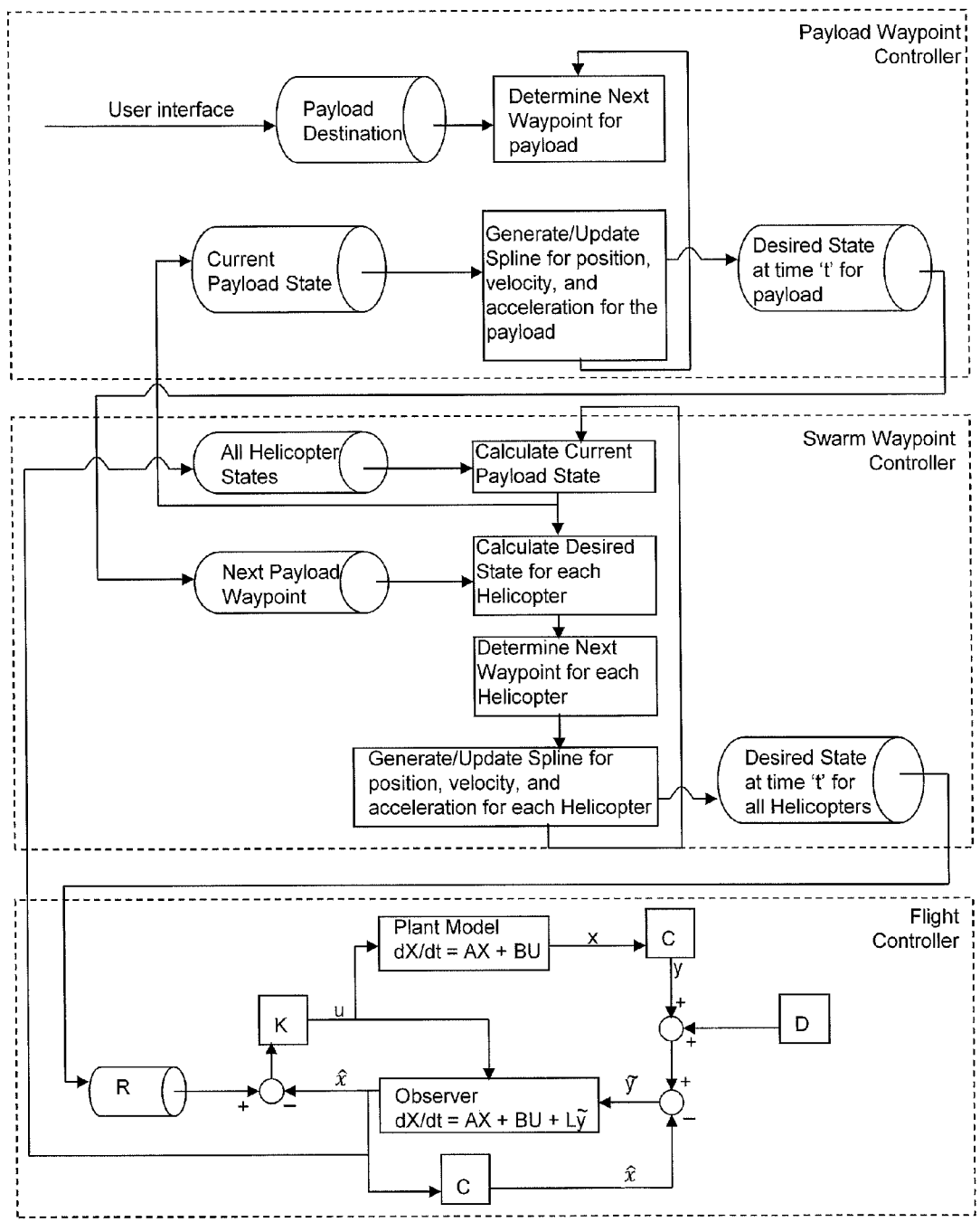
FIG. 9 is a flowchart of a detailed control system for a multi-aircraft lifting system.

The method for the multi-aircraft lifting control system is shown in further detail in FIG. 9. The control algorithm is divided amongst three main controllers, being the payload waypoint controller 802, the swarm waypoint controller 803, and the flight controller 804. Within the payload waypoint controller 802, the pilot interface 509 is used to receive the desired payload destination 801, which is then used for the next payload waypoint calculation 902. The next payload waypoint calculation 902 and the current payload state 901 are then used to determine the spline end-conditions for position, velocity, and acceleration of the payload 903 by way of numerical methods. It should be noted that the current payload state 901 is outputted from the swarm waypoint controller 803. The data from this spline calculation 903 is inputted back into the next payload waypoint calculation 902, forming a recursive relationship. The spline output from step 903 is then used to compute the desired state at time t for the payload 904.

With regard to the swarm waypoint controller 803 in FIG. 9, the controller 803 uses all aircraft states 905 and the next payload waypoint 908 as inputs. The aircraft states 905 originate from the flight controller 804 of each aircraft in the swarm 18, and the next payload waypoint originates from the step 904 in the payload waypoint controller 802. The aircraft states 905 are used in the calculation of the current payload state 906. The current payload state 906 and the next payload waypoint 908 are then used in step 907 for computing the desired state of each aircraft in the swarm 18. After step 907, the desired aircraft states are inputted into the step 909, where the next waypoints for each helicopter are calculated and then used to generated splines for each aircraft in step 910. These splines for position, velocity, and acceleration are used to derive the current state for each aircraft at time t 911, and to calculate step 906. Note that steps 906, 907, 909, and 910 form a recursive relationship within the swarm waypoint controller 803.

The desired states 911 for each aircraft are transmitted to the corresponding flight controllers 804, as shown in FIG. 9 in the example of a single flight controller 804. In other words, for an n aircraft swarm 18, the swarm waypoint controller 803 will generate n desired aircraft states 911, which are then transmitted to each of the n corresponding flight controllers 804 residing on each aircraft's processor 609. The desired aircraft state is considered the reference signal R 916 in a flight controller 804. It should be appreciated that the implementation of the flight controller 804 discussed herein is only one embodiment of the multi-aircraft lifting system. Alternate closed-loop control configurations may be used to stabilize and guide the movement of the aircraft.

Referring to FIG. 9, the reference signal R 916 is compared against the observed state $\hat{X}$ of the aircraft. The difference between R and $\hat{X}$ is used to compute the gain K in step 917, which then generates an input value u that is fed into the plant model 912 and the observer 915. The plant model 912 represents the mechanics and dynamics of the aircraft through mathematical relations. Typical values in the plant model include the position and velocity in a Cartesian coordinate frame, and the roll, pitch, and yaw of the aircraft. The actual state variables X of the aircraft are derived from the plant model 912, and are filtered by the observer matrix C 913. The observer matrix 913 selects a subset of states from matrix K that are passed into the observer 915. This embodiment of the flight controller 804 also takes into account disturbances, for example crosswinds, through the disturbance matrix D 914. The disturbances may cause the measured state values, y, to differ from the actual state variables, X.

The observer 915 is used to estimate state variables that may not be measured directly. The observer estimates the state of the aircraft $\hat{X}$ through the relation $\dot{\hat{X}}=A\hat{X}+BU+L\tilde{Y}$, where $\tilde{Y}=Y-\hat{Y}$. The matrices A and B represent the plant model, while matrix L, is designed to drive the difference between measured state values Y and estimated measured state values $\hat{Y}$ to zero, thereby driving $\hat{X}$ to X. The estimated state $\hat{X}$ for each helicopter is sent to the swarm waypoint controller 803, and is collected in a matrix 905.

In another embodiment of the multi-aircraft control system, the flight controller 804 may not require an observer as enough data may be available to accurately measure the all states of the aircraft.

Figure 13:
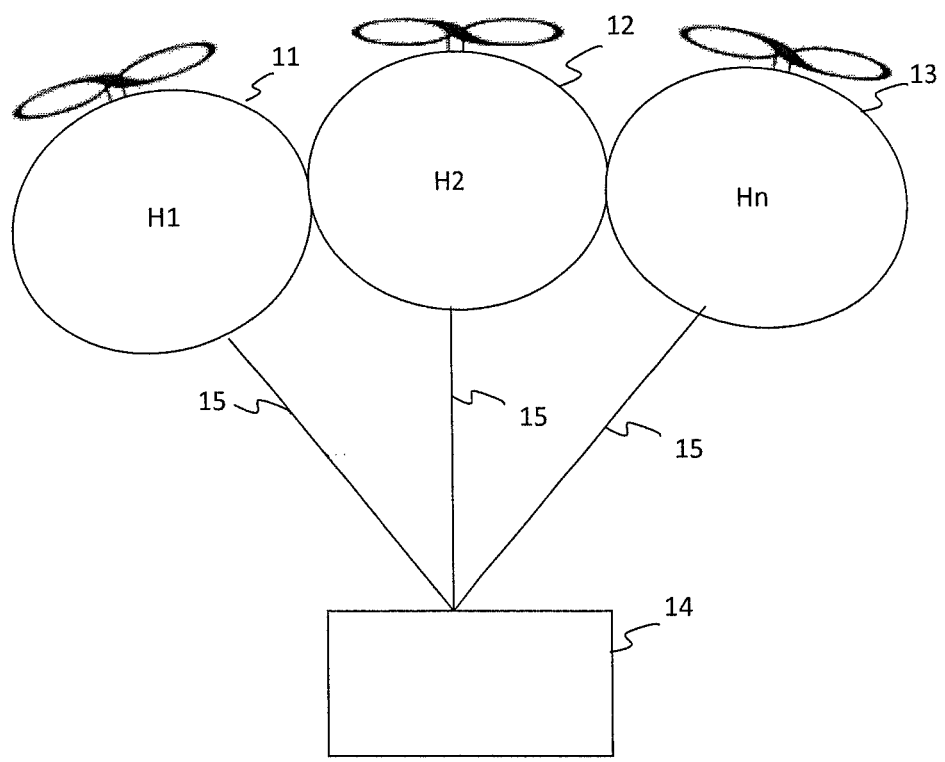
FIG. 13 is another schematic of relative positioning between a swarm and a payload with aircraft in contact with one another.

In another configuration of the relative positioning between aircraft, and airships in particular, the body of the aircraft may be constructed in such a way that the body of the aircraft are touching while flying in a swarm formation. In FIG. 13, three aircraft 11, 12, 13 are shown flying in formation while in contact with each other. It can be appreciated that any number of aircraft may fly in such a formation. In particular, airship bodies may be in contact if the envelope, or skin, or the airship provides sufficient force to withstand the forces exerted by another airship in contact. Moreover, the thrusters, ailerons or other external structures are positioned in locations on the airship envelope where there is no contact. Such structures, for example, may be positioned towards the top region of the airship. Alternatively, the external structures may be configured or protected to allow for contact with another airship, whereby no damage is done to the airship or external structure. This swarm configuration advantageously allows multiple aircraft to lift a smaller sized payload 14. This swarm configuration also advantageously allows for the tethers or connecting means 15 to attach on to the payload 14 at a centralized location. As can be understood, the swarm waypoint controller 803 generates waypoints to guide each aircraft, such that they maintain a certain relative positioning taking into account that the aircraft are in contact with each other.

Figure 14:
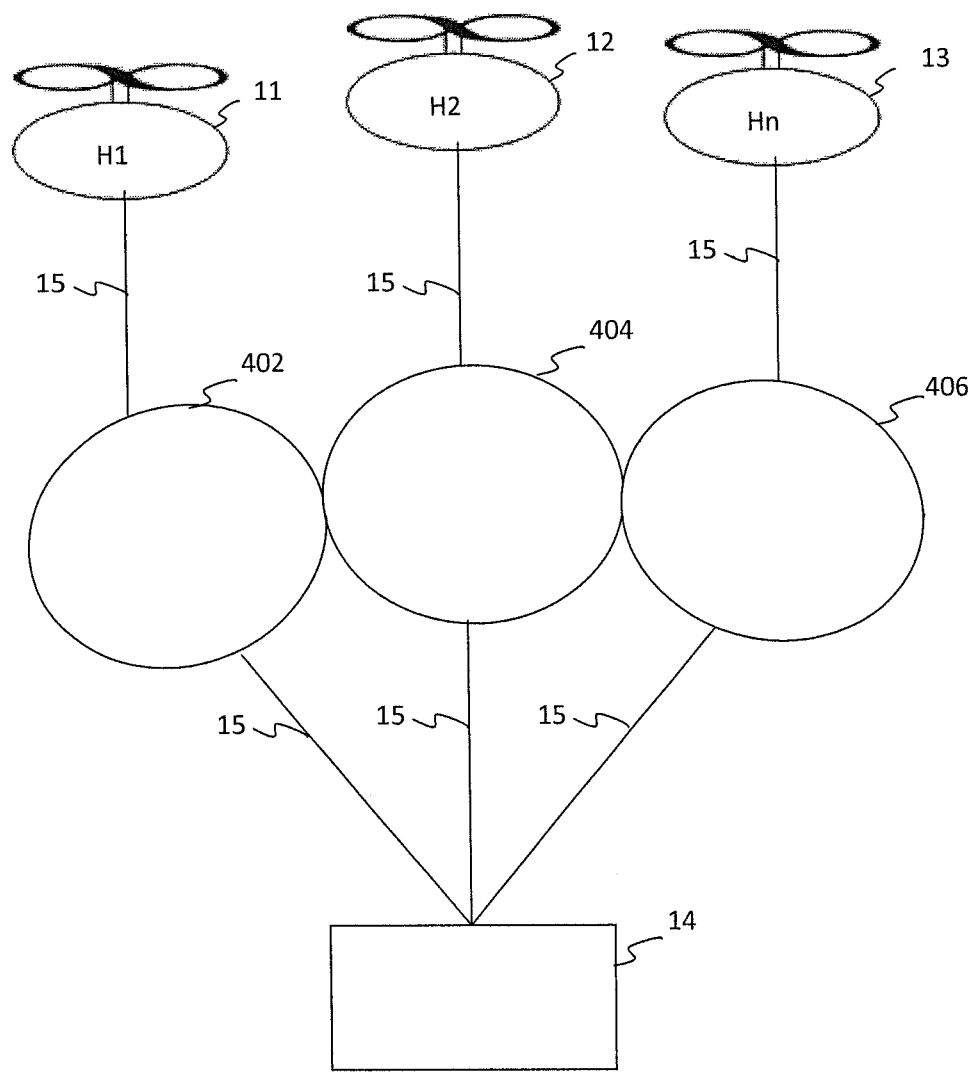
FIG. 14 is another schematic of relative positioning between a swarm and a payload with tether separating structures.

Another configuration of multiple aircraft is shown in FIG. 14 where tether separating structures 402, 404, 406 are used an intermediary between the aircraft 11, 12, 13 and the payload 14. For each aircraft, there is preferably a corresponding separating structure. Each separating structure is made of a rigid or semi-rigid body, whereby the separating structures can withstand external compression forces. They are preferably constructed to be light weight and, for example, include carbon fibre, steel tubing and fabrics. As the separating structures are pressing against one another, the separating structures are preferably rounded and have smooth outer surfaces to allow the separating structures to slide against each other. In particular, the tethers 15 extend from the payload 14 at a centralized location, such as a payload anchor 506. Each tether 15 extends upward from the payload 14 at an angle towards a respective tether separating structure 402, 404, 406. The tethers 15 above the separating structures extend approximately vertical towards each respective aircraft 11, 12, 13. It can be appreciated that the separating structures are sufficiently large to allow an aircraft to fly without exerting additional horizontal forces to be at a distance away from another aircraft in the swarm. This configuration is used in combination with the swarm waypoint controller 803 to maintain relative positions of the aircraft and payload 14.

Possible applications of the multi-aircraft lifting system include transporting an entire building, such as a warehouse. This has particular utility in oil and mining operations in remote locations, where drilling and mining sites are moved frequently. In remote locations where there is limited accessibility by land or water, it is advantageous to transport building structures by air. For example, for drilling operations in the Arctic or Antarctic regions, there are often little to no roads. A fleet of heavy lift airships may be deployed to transport buildings, equipment and vehicles in such remote regions. Some of the airships in the fleet are used to individually carry smaller or lighter payloads. Other airships within the fleet are used to form a swarm to carry larger or heavier payloads. The number of airships and the formation of the swarm may be configured to meet the payload's weight and size. Thus, the multi-aircraft system is flexible to the lifting operation. Further, transporting entire buildings, rather than components of a building for assembly and disassembly, reduces the assembly or set-up time for the oil and mining operations. This advantageously allows the oil and mining operations to achieve operational status in shorter times.

In another application, the multi-aircraft lifting system may be used to transport assembled large marine vessels from land to water, and vice versa. This would advantageously allow ship and submarine manufacturers to construct or repair marine vessels inland, away from the water. Transporting large marine vessels using the multi-aircraft system would also allow marine vessels to be launched in locations that are further away from land, where the water depth is preferable.

It can be appreciated that constructing, maintaining and storing multiple smaller aircraft may be more economical. Further, the aircraft in a multi-aircraft lifting system can be used for multiple purposes, in addition to heavy lifting. For example, an aircraft in one situation is used to transport passengers. In another situation, the same aircraft cooperates with other aircraft to form a swarm for lifting a common payload. A multiple-aircraft lifting system further provides redundancy and reliability. For example, should an aircraft in the swarm fail or be removed from the swarm for other reasons, the remaining aircraft in the swarm continue to lift the payload.

Although the multi-aircraft lifting system has been described with reference to certain embodiments, various modifications thereof will be apparent to those skilled in the art without departing from the spirit and scope of the multi-aircraft lifting system as outlined in the claims.

The invention claimed is:

1. A computing system configured for use in controlling a plurality of aircraft attached to a common payload, the plurality of aircraft configured to lift the common payload, the computing system comprising:
 a transceiver configured to receive data about at least one of said common payload and said plurality of aircraft; and
 a processor, in communication with said transceiver, configured to compute a path for said common payload towards a desired payload destination, configured to use said path and a current payload state to compute a desired payload state, and configured to use said current payload state and said desired payload state to compute a respective desired state for each one of said plurality of aircraft to transport said common payload along said path.

2. The computing system of claim 1, wherein said transceiver is configured to transmit said respective desired state for each one of said plurality of aircraft to a respective flight controller of said each one of said plurality of aircraft.

3. The computing system of claim 1, wherein said transceiver is configured to receive an aircraft state from a respective flight controller of each one of said plurality of aircraft.

4. The computing system of claim 1, wherein said transceiver is configured to receive information used to compute the current payload state from a payload avionics unit.

5. The computing system of claim 4 wherein the information is position information of the common payload.

6. The computing system of claim 1 configured to receive the desired payload destination from a pilot user interface.

7. The computing system of claim 1 wherein said processor is configured to compute said path based on an interpolation between said current payload state and said desired payload destination.

8. The computing system of claim 1 wherein said processor is configured to compute said current payload state by first obtaining the position of at least one of said plurality of aircraft, and then determine the position of said common payload relative to said at least one of said plurality of aircraft.

9. The computing system of claim 1 wherein said processor is configured to compute said respective desired state for each one of said plurality of aircraft by determining a next waypoint for said each one of said plurality of aircraft, and then update a spline for position, velocity and acceleration for said each one of said plurality of aircraft.

10. The computing system of claim 1 wherein said processor is configured to compute said respective desired state for each one of said plurality of aircraft to also maintain constant relative positioning between said plurality of aircraft.

11. A method performed by a computing device for use in controlling a plurality of aircraft to lift a common payload, the method comprising:
   computing a path for said common payload towards a desired payload destination;
   using said path and a current payload state to compute a desired payload state; and
   using said current payload state and said desired payload state to compute a respective desired state for each one of said plurality of aircraft to transport said common payload along said path.

12. The method of claim 11 further comprising transmitting said respective desired state for each one of said plurality of aircraft to a respective flight controller of said each one of said plurality of aircraft.

13. The method of claim 11 further comprising receiving an aircraft state from a respective flight controller of each one of said plurality of aircraft.

14. The method of claim 11 further comprising receiving information used to compute the current payload state from a payload avionics unit.

15. The method of claim 14 wherein the information is position information of the common payload.

16. The method of claim 11 further comprising receiving the desired payload destination from a pilot user interface.

17. The method of claim 11 further comprising computing said path based on an interpolation between said current payload state and said desired payload destination.

18. The method of claim 11 further comprising computing said current payload state by first obtaining the position of at least one of said plurality of aircraft, and then determining the position of said payload relative to said at least one of said plurality of aircraft.

19. The method of claim 11 further comprising computing said respective desired state for each one of said plurality of aircraft by determining a next waypoint for said each one of said plurality of aircraft, and then updating a spline for position, velocity and acceleration for said each one of said plurality of aircraft.

20. The method of claim 11 further comprising computing said respective desired state for each one of said plurality of aircraft to also maintain constant relative positioning between said plurality of aircraft.

21. A non-transitory computer readable medium comprising computer executable instructions for use in controlling a plurality of aircraft to lift a common payload, said computer executable instructions comprising:
   computing a path for said common payload towards a desired payload destination;
   using said path and a current payload state to compute a desired payload state; and
   using said current payload state and said desired payload state to compute a respective desired state for each one of said plurality of aircraft to transport said common payload along said path.

* * * * *